(12) United States Patent
Chou

(10) Patent No.: US 11,063,705 B2
(45) Date of Patent: Jul. 13, 2021

(54) METHODS AND APPARATUS FOR HARQ IN NOMA TRANSMISSION FOR 5G NR

(71) Applicant: Google LLC, Mountain View, CA (US)

(72) Inventor: Kao-Peng Chou, Taipei (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/387,000

(22) Filed: Apr. 17, 2019

(65) Prior Publication Data

US 2019/0386783 A1   Dec. 19, 2019

Related U.S. Application Data

(60) Provisional application No. 62/686,567, filed on Jun. 18, 2018.

(51) Int. Cl.
*H04L 1/18* (2006.01)
*H04L 5/00* (2006.01)
(Continued)

(52) U.S. Cl.
CPC .......... *H04L 1/1819* (2013.01); *H04L 1/1614* (2013.01); *H04L 5/0055* (2013.01);
(Continued)

(58) Field of Classification Search
CPC .... H04L 1/1614; H04L 1/1819; H04L 5/0005
See application file for complete search history.

(56) References Cited

U.S. PATENT DOCUMENTS 9,131,457 B2   9/2015   Nam et al.
9,712,272 B2   7/2017   Zhu et al.
(Continued)

FOREIGN PATENT DOCUMENTS

EP      3068060       9/2016
WO    2016188312    12/2016
(Continued)

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V0.0.0, Jun. 2017, 8 Pages.
(Continued)

*Primary Examiner* — Parth Patel
*Assistant Examiner* — Berhanu D Belete
(74) *Attorney, Agent, or Firm* — Colby Nipper PLLC

(57) ABSTRACT

In a Non-Orthogonal Multiple Access (NOMA) system, a user equipment (UE) can be configured to transmit signals with multiple access (MA) signatures. If a base station configures multiple MA signatures to a UE, the UE can select one or more MA signatures, then transmit signals in parallel, serial, or in hybrid ways. Due to the flexibility and complexity of the UE selecting MA signatures without an explicit configuration from the base station, additional control overhead is provided to support parallel HARQ processing. In addition, a new DCI format is disclosed that supports multi-branch NOMA transmission, which allows multiple ACK/NACKs within a DCI. Further, using the techniques disclosed herein, a base station can explicitly indicate ACK-NACKs without being assisted by a HARQ ID field.

14 Claims, 9 Drawing Sheets

(51) Int. Cl.
*H04L 1/16* (2006.01)
*H04W 76/27* (2018.01)
*H04W 72/04* (2009.01)

(52) U.S. Cl.
CPC ......... *H04W 72/042* (2013.01); *H04W 76/27* (2018.02); *H04L 5/0005* (2013.01)

(56) References Cited

U.S. PATENT DOCUMENTS

| | | | |
|---|---|---|---|
| 9,794,924 | B2 | 10/2017 | Lee et al. |
| 10,218,422 | B2 | 2/2019 | Raghavan et al. |
| 10,750,488 | B2 * | 8/2020 | He ........................ H04L 1/1887 |
| 10,904,868 | B2 * | 1/2021 | Lei ........................ H04L 5/0044 |
| 2011/0158117 | A1 | 6/2011 | Ho et al. |
| 2015/0195795 | A1 | 7/2015 | Loehr et al. |
| 2016/0066345 | A1 | 3/2016 | Sun et al. |
| 2016/0323832 | A1 | 11/2016 | Love et al. |
| 2017/0012754 | A1 | 1/2017 | Sun et al. |
| 2017/0251462 | A1 * | 8/2017 | Chae ................... H04W 52/242 |
| 2017/0310417 | A1 | 10/2017 | Jung et al. |
| 2017/0331573 | A1 | 11/2017 | Li |
| 2018/0048348 | A1 * | 2/2018 | Gau ................... H04W 72/0453 |
| 2018/0049190 | A1 | 2/2018 | Abedini et al. |
| 2018/0070274 | A1 | 3/2018 | Ode |
| 2018/0070335 | A1 | 3/2018 | Amuru et al. |
| 2018/0077685 | A1 | 3/2018 | Wu et al. |
| 2018/0123765 | A1 | 5/2018 | Cao et al. |
| 2018/0124684 | A1 * | 5/2018 | Kwon ............... H04W 28/0247 |
| 2018/0139774 | A1 | 5/2018 | Ma et al. |
| 2018/0145797 | A1 | 5/2018 | Yeo et al. |
| 2018/0152907 | A1 | 5/2018 | Zhang et al. |
| 2018/0167932 | A1 | 6/2018 | Papasakellariou |
| 2018/0199359 | A1 | 7/2018 | Cao et al. |
| 2018/0302191 | A1 | 10/2018 | Park et al. |
| 2019/0045489 | A1 * | 2/2019 | He ........................ H04W 72/12 |
| 2019/0053226 | A1 * | 2/2019 | Xiong ................... H04L 5/0091 |
| 2019/0081657 | A1 | 3/2019 | Zeng et al. |
| 2019/0082456 | A1 | 3/2019 | Kim et al. |
| 2019/0174472 | A1 | 6/2019 | Lee et al. |
| 2019/0190753 | A1 * | 6/2019 | Bayesteh ................. H04L 27/36 |
| 2019/0289628 | A1 * | 9/2019 | Xiong ............... H04W 72/0446 |
| 2019/0313402 | A1 * | 10/2019 | Lei ........................ H04L 27/20 |
| 2020/0014457 | A1 | 1/2020 | Tang |
| 2020/0059322 | A1 | 2/2020 | Lei et al. |
| 2020/0119958 | A1 * | 4/2020 | Bayesteh ............ H04J 13/0003 |
| 2020/0154442 | A1 | 5/2020 | Zhou |
| 2020/0154481 | A1 | 5/2020 | Goto et al. |
| 2020/0213901 | A1 | 7/2020 | Yoshimoto et al. |
| 2020/0404634 | A1 * | 12/2020 | He ........................ H04L 1/1887 |
| 2021/0029693 | A1 | 1/2021 | Meng |
| 2021/0045181 | A1 * | 2/2021 | Li ........................ H04L 5/0005 |

FOREIGN PATENT DOCUMENTS

| | | | |
|---|---|---|---|
| WO | 2017050760 | 3/2017 | |
| WO | 2017055271 | 4/2017 | |
| WO | 201702950 | 6/2017 | |
| WO | 2017167198 | 10/2017 | |
| WO | 2017194001 | 11/2017 | |
| WO | 2017209570 | 12/2017 | |
| WO | 2017212104 | 12/2017 | |
| WO | 2018021819 | 2/2018 | |
| WO | 2018031620 | 2/2018 | |
| WO | 2018031770 | 2/2018 | |
| WO | 2018032014 | 2/2018 | |
| WO | 2018061572 | 4/2018 | |
| WO | 2018062842 | 4/2018 | |
| WO | 2018062976 | 4/2018 | |
| WO | 2018064582 | 4/2018 | |
| WO | WO-2018064582 A1 * | 4/2018 | ........... H04L 1/1861 |
| WO | 2018085045 | 5/2018 | |
| WO | 2018128200 | 7/2018 | |
| WO | 2018174649 | 9/2018 | |
| WO | 2018130115 | 7/2019 | |
| WO | 2019240887 | 12/2019 | |
| WO | 2019240903 | 12/2019 | |
| WO | 2019245662 | 12/2019 | |
| WO | 2019246429 | 12/2019 | |
| WO | 2020033434 | 2/2020 | |
| WO | 2020069090 | 4/2020 | |

OTHER PUBLICATIONS

"3rd Generation Partnership Project; Technical Specification Group Radio Access Network; NG-RAN; Architecture description (Release 15)", 3GPP TS 38.401 V15.0.0, Dec. 2017, 9 Pages.
"3rd Generation Partnership Project; Technical Specification Group Radio Access Network; NG-RAN; Xn application protocol (XnAP) (Release 15)", 3GPP TS 38.423 V1.0.0, Jun. 2018, 9 Pages.
"3rd Generation Partnership Project; Technical Specification Group Radio Access Network; NR; Multiplexing and channel coding (Release 15)", 3GPP TS 38.212 V15.2.0, Jun. 2018, 105 pages.
"3rd Generation Partnership Project; Technical Specification Group Radio Access Network; NR; NR and NG-RAN Overall Description; Stage 2 (Release 15)", 3GPP TS 38.300 V15.0.0, Dec. 2017, 68 Pages.
"3rd Generation Partnership Project; Technical Specification Group Radio Access Network; NR; Physical channels and modulation (Release 15)", 3GPP TS 38.211 V15.2.0, Jun. 2018, 46 pages.
"3rd Generation Partnership Project; Technical Specification Group Radio Access Network; NR; Physical layer procedures for control (Release 15)", 3GPP TS 38.213 V15.2.0, Jun. 2018, 49 pages.
"3rd Generation Partnership Project; Technical Specification Group Radio Access Network; NR; Physical layer procedures for data (Release 15)", 3GPP TS 38.214 V15.2.0, Jun. 2018, 95 pages.
"3rd Generation Partnership Project; Technical Specification Group Radio Access Network; NR; Radio Resource Control (RRC); Protocol specification (Release 15)", 3GPP TS 38.331 V0.0.1, Mar. 2017, 13 Pages.
"3rd Generation Partnership Project; Technical Specification Group Radio Access Network; Study on Integrated Access and Backhaul; (Release 15)", 3GPP TR 38.874 V0.2.1, May 2018, 19 Pages.
"Considerations on Link Rate Adaptation for NOMA", 3GPP TSG RAN WG1 Meeting #93, Busan, Korea, May 2018, 4 pages.
"Considerations on NOMA Procedures", 3GPP TSG RAN WG1 Meeting #93, Busan, Korea, May 2018, 3 pages.
"Discussion on Categorization of MA Schemes and Target Scenarios", 3GPP TSG RAN WG1 Meeting #86, Gothenburg, Sweden, Aug. 2016, 3 pages.
"Discussion on NOMA Procedure", 3GPP TSG RAN WG1 Meeting #93, Busan, Korea, May 2018, 4 pages.
"Discussion on NOMA Procedures", 3GPP TSG RAN WG1 Meeting #92bis, Sanya, China, Feb. 2018, 4 pages.
"Discussion on Receivers for NoMA", 3GPP TSG RAN WG1 #92 Meeting, Athens, Greece, Feb. 2018, 5 Pages.
"Final Report of 3GPP TSG RAN WG1 #86bis v1.0.0", Final Report of 3GPP TSG RAN WG1 #86bis v1.0.0, (Lisbon, Portugal), Oct. 2016, 160 pages.
"Final Report of 3GPP TSG RAN WG1 #92bis v1.0.0AN WG1 #92bis v1.0.0", Final Report of 3GPP TSG RAN WG1 #92bis v1.0.0, (Sanya, China), Apr. 2018, 195 pages.
"Grant-Free UL Transmissions in NR", 3GPP TSG-RAN WG1 #86bis, Lisbon, Portugal, Oct. 2016, 8 pages.
"International Search Report and Written Opinion", PCT Application No. PCT/US2019/045346, dated Oct. 17, 2019, 17 pages.
"International Search Report and Written Opinion", PCT Application No. PCT/US2019/029691, dated Jul. 19, 2019, 12 pages.
"International Search Report and Written Opinion", PCT Application No. PCT/US2019/032285, dated Aug. 14, 2019, 85 pages.
"International Search Report and Written Opinion", PCT Application No. PCT/US2019/031059, dated Aug. 19, 2019, 16 pages.
"International Search Report and Written Opinion", PCT Application No. PCT/US2019/038295, dated Sep. 4, 2019, 14 pages.
"Key Processing Modules at Transmitter Side for NOMA", 3GPP TSG RAN WG1 Meeting #93, Busan, Korea, May 2018, 11 pages.

(56) References Cited

OTHER PUBLICATIONS

"NOMA Related Procedure", 3GPP TSG RAN WG1 Meeting #93, Busan, Korea, May 2018, 8 pages.
"On Categorization of MA Schemes for NR", 3GPP TSG-RAN WG1 Meeting #86, Gothenburg, Sweden, Aug. 2016, 2 pages.
"Receivers for NOMA", 3GPP TSG RAN WG1 Meeting #92, Athens, Greece, Feb. 2018, 8 Pages.
"Summary of [86-18] Email Discussion on Categorization for NR MA Schemes", 3GPP TSG RAN WG1 Meeting #86bis, Lisbon, Portugal, Oct. 2016, 7 pages.
"Technical Specification Group Radio Access Network; NG-RAN; F1 application protocol (F1AP) (Release 15)", 3GPP TS 38.473 V15.0.0, Dec. 2017, 9 Pages.
"Typical multi-user receivers for NOMA", 3GPP TSG RAN WG1 Meeting #92, Athens, Greece, Feb. 2018, 14 Pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"WF on UL Multiple Access Scheme Categorization for mMTC", 3GPP TSG RAN WG1 #86, Gothenburg, Sweden, Aug. 2016, 3 pages.
Wu, "Handling Overheating in a Wireless-Communication Device", Technical Disclosure Commons; Retrieved from https://www.tdcommons.org/dpubs_series/2343, Jul. 12, 2019, 22 pages.
Yuan, et al., "Blind Multi-User Detection for Autonomous Grant-Free High-Overloading MA Without Reference Signal", ZTE Corporation, South Keji Road, 55, Shenzhen, China, 508118, Dec. 7, 2017, 13 pages.
Yuan, "NOMA Study in 3GPP for 5G", ISTC 2018, Hong Kong, Dec. 2018, 32 pages.
"CU-DU Interface: Overall Categorization of C-Plane and U-Plane", TSG-RAN Working Group 3 meeting #95, Athens, Greece, Feb. 13-17, 2017, Feb. 2017, 9 pages.
"F1 Interface: Radio Resource Configuration Management", TSG-RAN Working Group 3 meeting #96, Hangzhou, China, May 15-19, 2017, May 2017, 4 pages.
"Grant-less and Non-orthogonal UL Transmissions in NR", 3GPP TSG-RAN WG1 #86, Gothenburg, Sweden, Aug. 22-26, 2016, Aug. 2016, 5 pages.
"International Search Report and Written Opinion", PCT Application No. PCT/US2019/053105, dated Dec. 10, 2019, 17 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.
"Written Opinion", PCT Application No. PCT/US2019/045346, dated Jun. 22, 2020, 7 pages.
Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
"International Preliminary Report on Patentability", Application No. PCT/US2019/045346, dated Nov. 13, 2020, 12 pages.
"International Preliminary Report on Patentability", Application No. PCT/US2019/029691, dated Dec. 15, 2020, 7 pages.
"International Preliminary Report on Patentability", Application No. PCT/US2019/032285, dated Dec. 15, 2020, 7 pages.
"International Preliminary Report on Patentability", Application No. PCT/US2019/031059, dated Dec. 22, 2020, 11 pages.
"International Preliminary Report on Patentability", Application No. PCT/US2019/038295, dated Dec. 22, 2020, 8 pages.
"Non-Final Office Action", U.S. Appl. No. 16/427,712, dated Nov. 4, 2020, 17 pages.
"Procedures related consideration to NoMA", 3GPP TSG RAN WG1 Meeting #92bis—R1-1804398, Apr. 2018, 6 pages.
"Status Report to TSG", 3GPP TSG RAN meeting #77—RP-172105, Sep. 2017, 4 pages.
"International Preliminary Report on Patentability", PCT Application No. PCT/US2019/053105, dated Apr. 8, 2021, 9 pages.

* cited by examiner

METHODS AND APPARATUS FOR HARQ IN NOMA TRANSMISSION FOR 5G NR

RELATED APPLICATION

This application claims priority under 35 U.S.C. § 119(e) to U.S. Provisional Patent Application 62/686,567, filed on Jun. 18, 2018, which is incorporated herein by reference in its entirety.

BACKGROUND

In Fourth Generation Long Term Evolution (4G LTE), data transmission is scheduled by a base station through Downlink Control Information (DCI). One DCI format is an uplink (UL) grant, which indicates a physical resource, modulation type and coding scheme (MCS), Redundancy Version (RV), and so on. Although many transmission schemes used in 4G LTE can also be used in Fifth Generation New Radio (5G NR), some are inefficient in 5G NR.

SUMMARY

This document discloses procedures and apparatus for hybrid automatic repeat request (HARQ) in non-orthogonal multiple access (NOMA) transmission for Fifth Generation New Radio (5G NR).

This summary is provided to introduce simplified concepts of HARQ in NOMA for 5G NR. The simplified concepts are further described below in the Detailed Description. This summary is not intended to identify essential features of the claimed subject matter, nor is it intended for use in determining the scope of the claimed subject matter.

BRIEF DESCRIPTION OF THE DRAWINGS

Aspects of HARQ in NOMA transmission for 5G NR are described with reference to the following drawings. The same numbers are used throughout the drawings to reference like features and components.

DETAILED DESCRIPTION

In a Non-Orthogonal Multiple Access (NOMA) system, the user equipment (UE) can be configured to transmit signals with an additional signal processing referred to as multiple access (MA) signatures. By applying multi-user detection (MUD) in the base station and an MA signature in the UE, NOMA increases overall system throughput. If a base station configures multiple MA signatures to a UE, the UE can select one or more MA signatures, then transmit signals in parallel, serial, or in hybrid ways. Due to the flexibility and complexity of the UE selecting MA signatures without an explicit configuration from the base station, the HARQ mechanism needs additional control overhead to support parallel HARQ processing. For example, in grant-free transmission with a UE selecting an MA signature, a base station has no information about the order or hybrid automatic repeat request (HARQ) identifier (ID) of a UE transmitted transport block. Additionally, current downlink control information (DCI) formats in 5G NR do not support acknowledgement/negative acknowledgment (ACK-NACK) to multiple uplink (UL) transmissions. Further, a UE does not expect to receive multiple DCIs within a COntrol REsource (CORE) set.

To address the above-described issues, a new DCI format is disclosed that supports multi-branch NOMA transmission, which allows multiple ACK/NACKs within a DCI. Further, using the techniques disclosed herein, a base station can explicitly indicate ACK-NACKs without being assisted by a HARQ ID field. An alternative solution is to use a technology similar to the autonomous UL (AUL) downlink feedback information (DFI) in further enhancements to Licensed Assisted Access (LAA), where the AUL-DFI is a bitmap with each bit indicating an AUL-enabled HARQ process ID.

Figure 1:
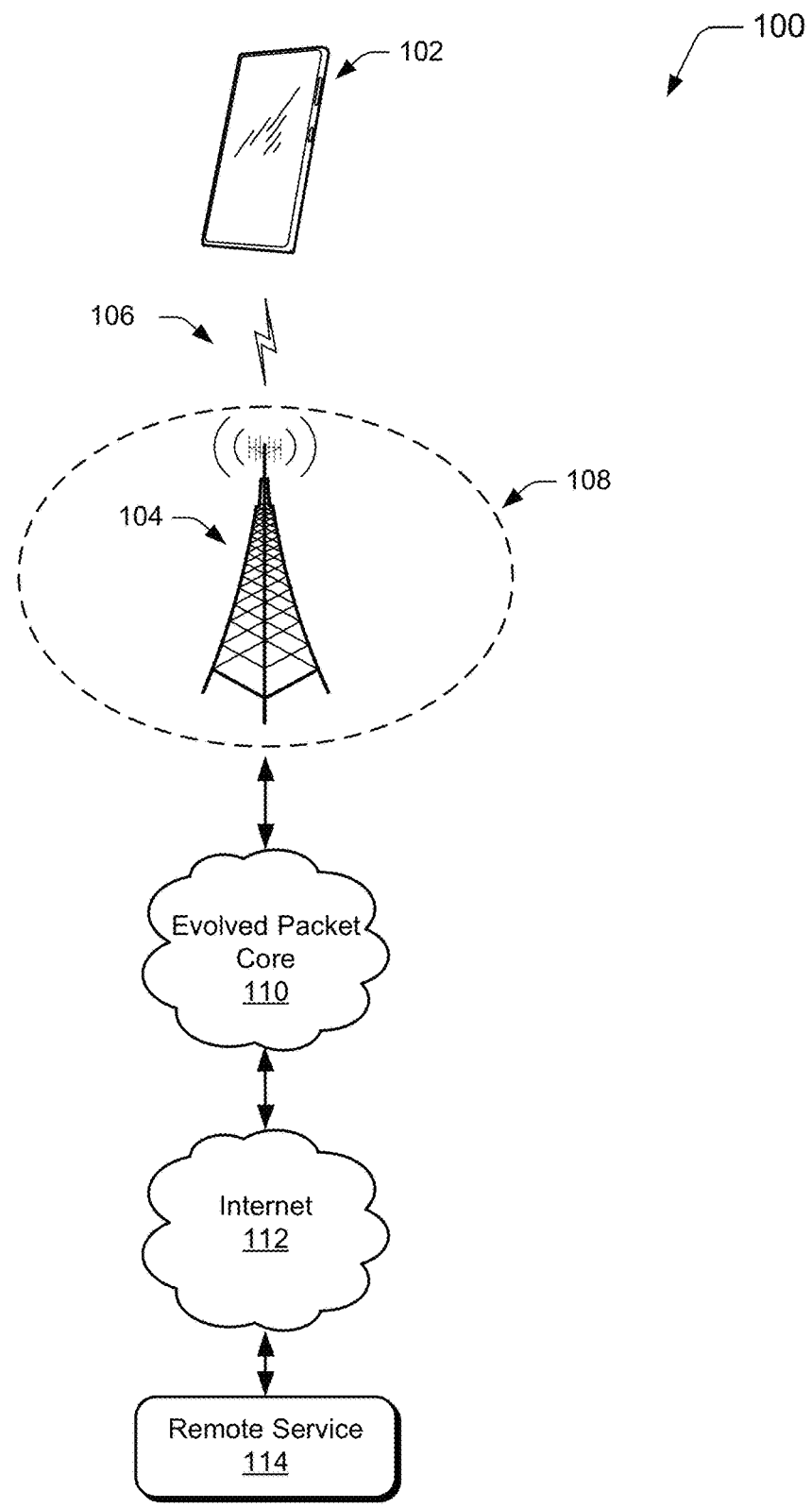
FIG. 1 illustrates an example wireless network system in which various aspects of HARQ in NOMA transmission for 5G NR can be implemented.

FIG. 1 illustrates an example environment 100 which includes a user equipment 102 that communicates with a base station 104 that acts as a serving cell, (serving cell base station 104), through a wireless communication link 106 (wireless link 106). In this example, the user equipment 102 is implemented as a smartphone. Although illustrated as a smartphone, the user equipment 102 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base station 104 (e.g., an Evolved Universal Terrestrial Radio Access Network (E-UTRAN) including at least one evolved Node B (eNodeB or eNB), a Next Generation Node B (gNodeB or gNB), a long-term evolution (LTE) system, an LTE-Advanced (LTE-A) system, an evolution of the LTE-A system, a 5G NR system, and the like) may be implemented in a macrocell, microcell, small cell, picocell, and the like, or any combination thereof. In aspects, the eNB, gNB, or the relay may be referred to as a base station.

The serving cell base station 104 communicates with the user equipment 102 via the wireless link 106, which may be implemented as any suitable type of wireless link. The wireless link 106 can include a downlink of data and control information communicated from the serving cell base station 104 to the user equipment 102 and/or an uplink of other data and control information communicated from the user equipment 102 to the serving cell base station 104. The wireless link 106 may include one or more wireless links or bearers implemented using any suitable communication protocol or standard, or combination of communication protocols or standards such as 3rd Generation Partnership Project Long-Term Evolution (3GPP LTE), 5G NR, and so forth.

The serving cell base station 104 may be part of a Radio Access Network 108 (RAN 108, Evolved Universal Terrestrial Radio Access Network 108, E-UTRAN 108), which is connected via an Evolved Packet Core 110 (EPC 110) network to form a wireless operator network. The UE 102 may connect, via the EPC 110, to public networks, such as the Internet 112 to interact with a remote service 114.

Figure 2:
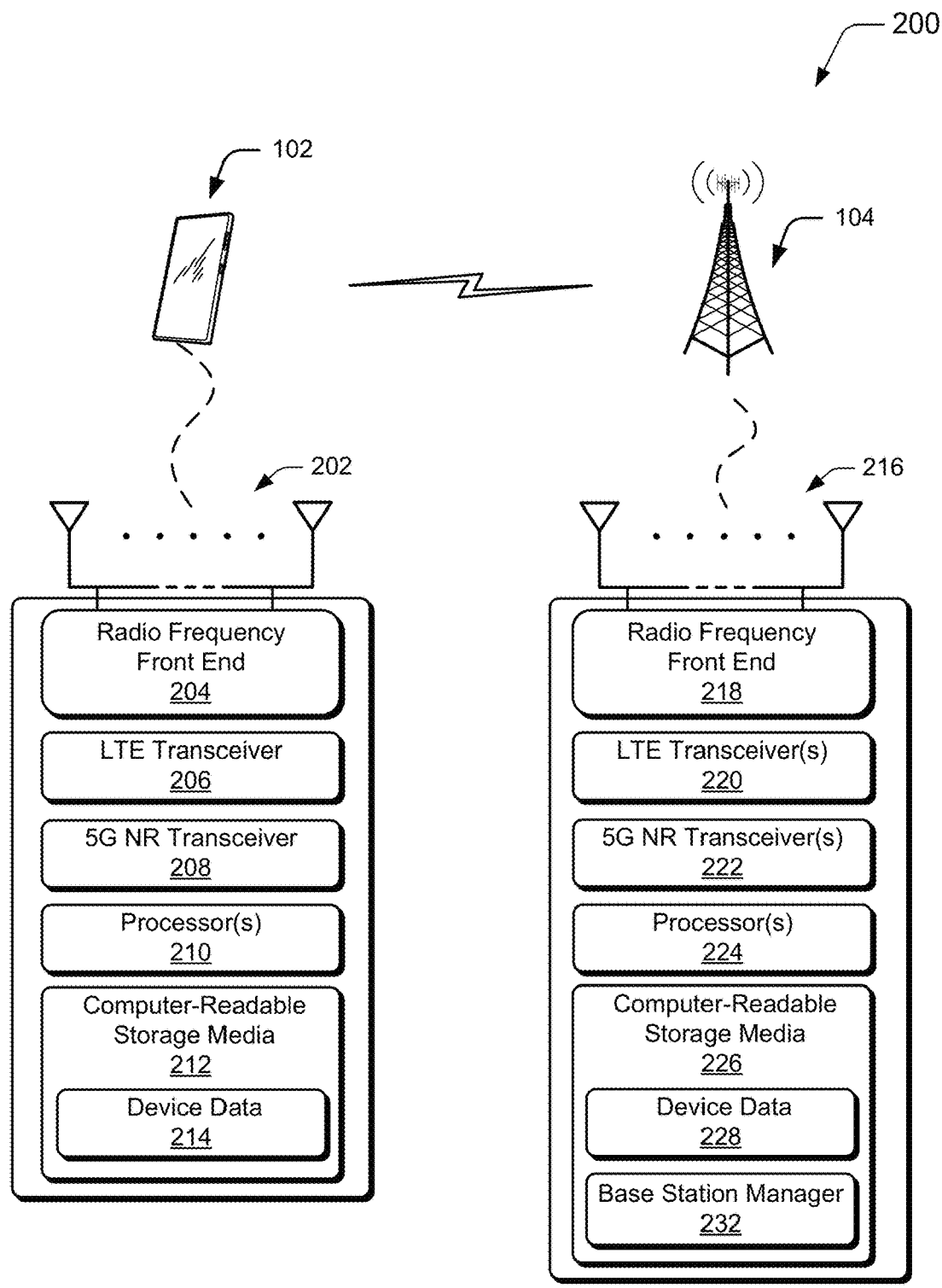
FIG. 2 illustrates an example device diagram that can implement various aspects of HARQ in NOMA transmission for 5G NR.

FIG. 2 illustrates an example device diagram 200 of the user equipment 102 and the serving cell base station 104. It should be noted that only the essential features of the user equipment 102 and the serving cell base station 104 are illustrated here for the sake of clarity. The user equipment 102 includes antennas 202, a radio frequency front end 204 (RF front end 204), an LTE transceiver 206, and a 5G NR transceiver 208 for communicating with base stations 104 in the E-UTRAN 108. The RF front end 204 of the user equipment 102 can couple or connect the LTE transceiver 206, and the 5G NR transceiver 208 to the antennas 202 to facilitate various types of wireless communication.

The antennas 202 of the user equipment 102 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards. Alternatively, the 5G NR transceiver 208 may be replaced with a 5G NR receiver and operations describe herein as performed by the 5G NR transceiver 208 may performed by the 5G NR receiver.

The user equipment 102 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as subscriber identity module (SIM), random-access memory (RAM), static RAM (SRAM), dynamic RAM (DRAM), non-volatile RAM (NVRAM), read-only memory (ROM), Flash memory, hard disk, or optical data storage device useful to store device data 214 of the user equipment 102. The device data 214 includes user data, multimedia data, applications, and/or an operating system of the user equipment 102, which are executable by processor(s) 210 to enable user interaction with the user equipment 102.

The device diagram for the serving cell base station 104 shown in FIG. 2 includes a single network node (e.g., an E-UTRAN Node B or gNode B). The functionality of the serving cell base station 104 may be distributed across multiple network nodes and/or devices, may be and distributed in any fashion suitable to perform the functions described herein. The serving cell base station 104 includes antennas 216, a radio frequency front end 218 (RF front end 218), one or more LTE transceivers 220, and/or one or more 5G NR transceivers 222 for communicating with the user equipment 102. The RF front end 218 of the serving cell base station 104 can couple or connect the LTE transceivers 220 and the 5G NR transceivers 222 to the antennas 216 to facilitate various types of wireless communication.

The antennas 216 of the serving cell base station 104 may include an array of multiple antennas that are configured similar to or differently from each other. The antennas 216 and the RF front end 218 can be tuned to, and/or be tunable to, one or more frequency band defined by the 3GPP LTE and 5G NR communication standards, and implemented by the LTE transceivers 220, and/or the 5G NR transceivers 222. Additionally, the antennas 216, the RF front end 218, the LTE transceivers 220, and/or the 5G NR transceivers 222 may be configured to support beamforming, such as massive multiple input multiple output (mMIMO), for the transmission and reception of communications with the user equipment 102.

The serving cell base station 104 also includes processor(s) 224 and computer-readable storage media 226 (CRM 226). The processor 224 may be a single core processor or a multiple core processor composed of a variety of materials, such as silicon, polysilicon, high-K dielectric, copper, and so on. CRM 226 may include any suitable memory or storage device such as random-access memory (RAM), static RAM (SRAM), dynamic RAM (DRAM), non-volatile RAM (NVRAM), read-only memory (ROM), or Flash memory useful to store device data 228 of the serving cell base station 104. The device data 228 includes network scheduling data, radio resource management data, applications, and/or an operating system of the serving cell base station 104, which are executable by processor(s) 224 to enable communication with the user equipment 102.

CRM 228 also includes a base station manager 232, which, in one implementation, is embodied on CRM 228 (as shown). Alternately or additionally, the base station manager 232 may be implemented in whole or part as hardware logic or circuitry integrated with or separate from other components of the serving cell base station 104. In at least some aspects, the base station manager 232 configures the LTE transceivers 222 and the 5G NR transceivers 224 for communication with the user equipment 102, as well as communication with the EPC 114.

Figure 3:
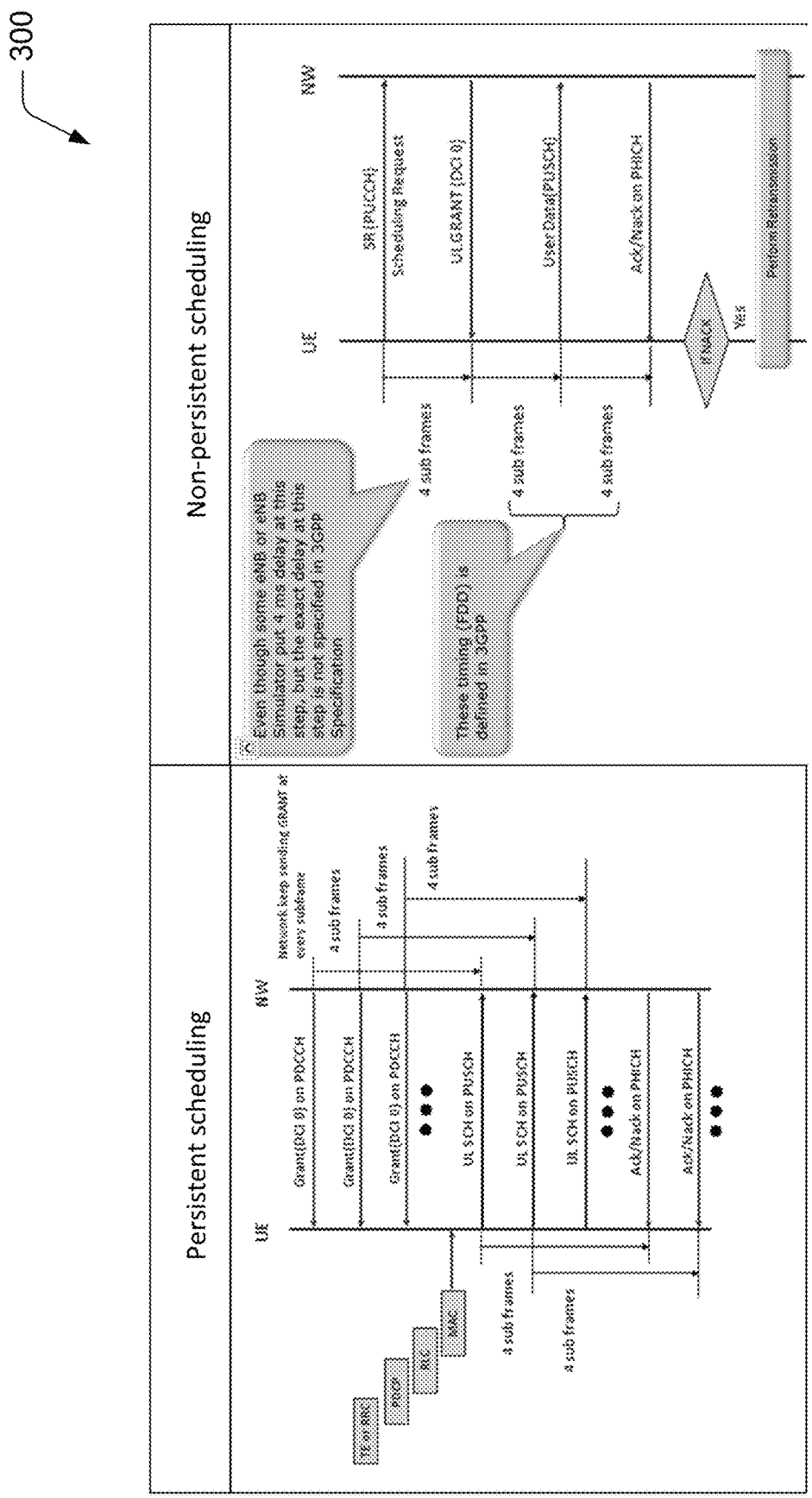
FIG. 3 illustrates two example techniques for a user equipment (UE) to transmit data to the base station through Physical Uplink Shared Channel (PUSCH).

FIG. 3 illustrates two example techniques for a UE to transmit data to the base station through Physical Uplink Shared CHannel (PUSCH). One technique includes persistent scheduling, in which an LTE base station (eNB) transmits a UL grant to the UE in every subframe. In this case, if the UE has any data to send, the UE can use the resources allocated in the grant. Another technique includes non-persistent scheduling. Using non-persistent scheduling, if a UE has UL data to send, it sends a Scheduling Request (SR) by Physical Uplink Control CHannel (PUCCH) to the eNB. The eNB can then schedule a UL grant to the UE for the following UL data transmission.

In Fifth Generation New Radio (5G NR), massive machine type communication (mMTC) supports a large number of devices in a cell. As a result, increased UL scheduling is required and the overhead of control signaling increases accordingly. To solve this problem, grant-free transmission can be used as a generic function in 5G NR.

Generally, grant-free transmission enables a 5G base station (gNB) to allocate a physical resource as a shared physical resource, and subsequently, the gNB can instruct a group of UEs to transmit UL data on the shared resource without a UL grant.

Non-orthogonal multiple access (NOMA) spreads signals onto a larger and shared resource grid at a bit and symbol level, where the shared resource grid corresponds to one or more of frequency domain, a time domain, a code domain, or a spatial domain. The spreading can be exploited by the base station with multiple user detection (MUD) to distinguish signals from distinct UEs. Accordingly, assisted by NOMA spreading, the base station with NOMA MUD can distinguish signals from these UEs regardless of whether their signals are mapped on the same frequency, time, and/or code resource, or using the same antenna configuration.

Moreover, because the receiving power is recognized as a general multiple access (MA) signature, a UE with the same NOMA spreading, mapped on the same frequency, time, and code resource, and using the same antenna configuration, but with a different receiving power in the base station, may also be distinguished. Bit-level and symbol-level signal processing such as spreading, repetition, scrambling, sparse resource mapping, and forward error control (FEC) coding can be used. In aspects, an MA signature can be utilized in any suitable signal processing scheme, such as UE-specific bit-level scrambling, UE-specific bit-level interleaving, UE-specific symbol-level spreading (usable with 5G NR legacy modulation or modified modulation), UE-specific symbol-level scrambling, UE-specific symbol-level interleaving (with symbol-level zero padding), UE-specific power assignment, UE-specific sparse RE mapping, cell-specific MA signature, or multi-branch/MA signature transmission (irrespective of rank) per UE.

Figure 4:
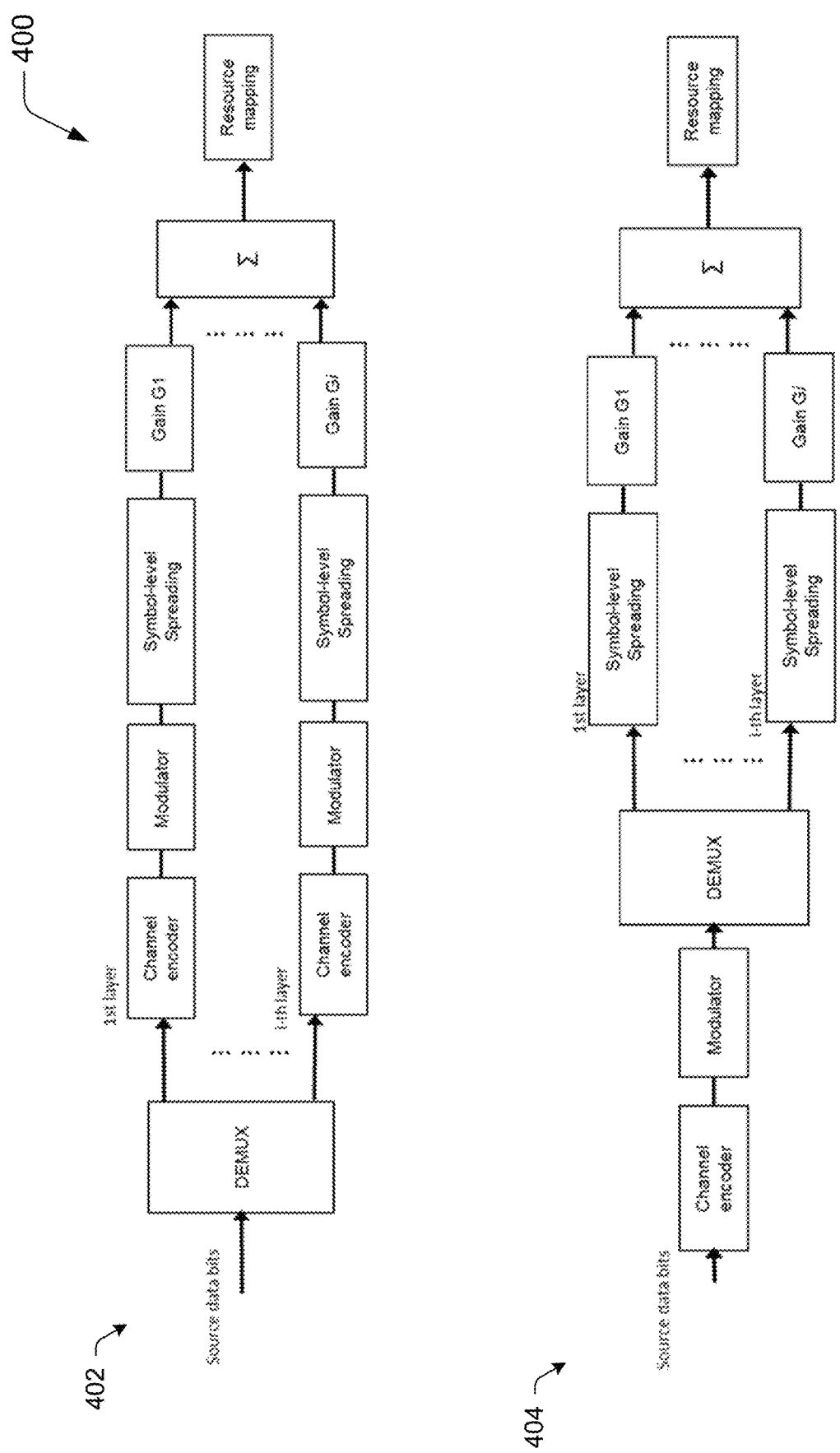
FIG. 4 illustrates examples of multi-layer transmission.

Another NOMA application is multi-branch transmission, which is illustrated in FIG. 4. A UE can transmit multiple signals with different MA signatures in parallel. This technique provides an additional dimension of time, frequency, and space. Multi-layer linear superposition per user can be considered in order to achieve high per-user spectral efficiency. This multi-layer processing can be common to multiple ones of the above-mentioned schemes, where UE-specific MA signature should be replaced by layer-specific MA signature if multi-layer transmission is applied, and the layer-specific MA signatures can be either orthogonal or non-orthogonal. In the illustrated example depicted in FIG. 4, different operations exist for multi-layer transmission, including before FEC (scenario 402) and after modulation (scenario 404).

For the multi-layer splitting at bit-level, each layer's data is individually encoded. Minimum mean squared error (MMSE) can be applied with hard successive interference cancellation (SIC) at the receiver where each layer's data is decoded one-by-one. Additional Cyclical Redundancy Check (CRC) overhead may be required for the hard interference cancellation and reconstruction of each layer's data, which may result in some performance loss due to the higher coding rate.

For the multi-layer splitting at symbol-level, each layer's data shares the same FEC and modulation, and there is no need of additional CRC overhead compared with the above-described multi-layer splitting at bit-level mode. However, interference of each layer's data cannot be fully cancelled with hard-SIC since the CRC check can only be performed after the combination of each user's data from the multiple layers. In this case, soft parallel interference cancellation (PIC) may be implemented to reduce the inter-layer interferences.

Figure 5:
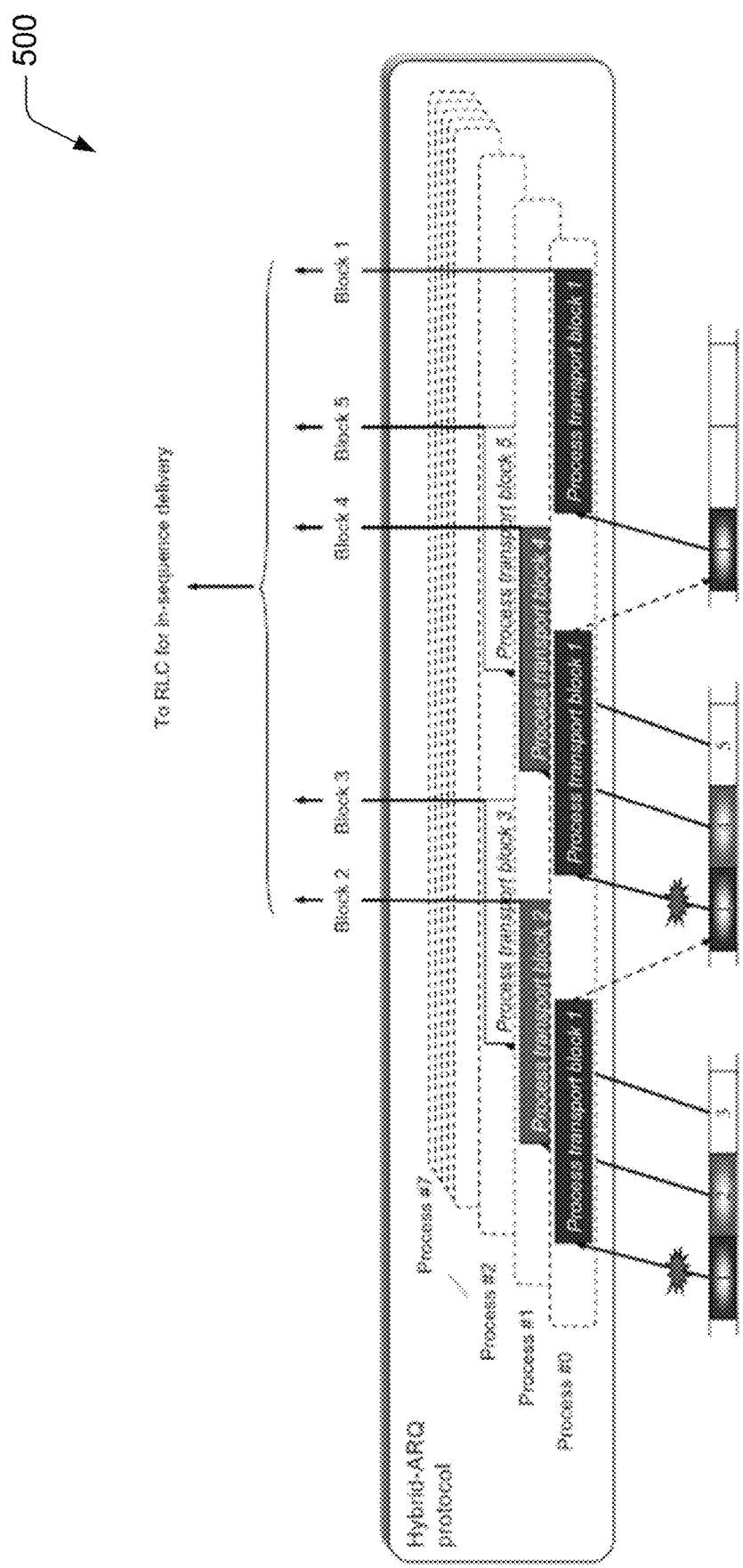
FIG. 5 shows an example implementation of parallel HARQ processes that LTE supports simultaneously.

FIG. 5 shows an example implementation 500 of parallel HARQ processes that LTE supports simultaneously. Generally, LTE can support up to eight HARQ processes simultaneously. The HARQ procedures can be classified in synchronous/asynchronous and adaptive/non-adaptive schemes according to the freedom to schedule a retransmission in time and frequency.

In an example, using a downlink (DL) adaptive HARQ, the eNB sends downlink control information (DCI) to schedule the UE to receive a signal from an indicated physical resource with a HARQ process identifier (ID). If the UE successfully receives and decodes the signal, the UE sends an acknowledgment (ACK) to the eNB. If, however, the UE failed to receive and decode the signal, the UE sends a negative acknowledgment (NACK) to the eNB. After the eNB receives the NACK, the eNB can send a new DCI to schedule a retransmission of the signal in another physical resource with the same HARQ process ID. When the UE receives the retransmitted signal with the same HARQ ID, the UE can soft-combine these two signals and try to decode again. The retransmission may repeat until a successful transmission or until the procedure exceeds the maximum HARQ number.

In 5G NR, HARQ ACK feedback with one bit per transport block (TB) is supported. Operation of more than one DL HARQ process is supported for a given UE while operation of one DL HARQ process is supported for some UEs. Generally, the UE supports a set of minimum HARQ processing times. 5G NR also supports different minimum HARQ processing times across UEs. The HARQ processing time includes at least one delay between DL data reception timing and the corresponding HARQ ACK transmission timing, and another delay between UL grant reception timing and the corresponding UL data transmission timing. In these scenarios, the UE is required to indicate its capability of minimum HARQ processing time to the gNB.

Asynchronous and adaptive DL HARQ is supported at least for enhanced Mobile Broadband (eMBB) and Ultra Reliable Low Latency Communication (URLLC). From a UE perspective, HARQ ACK/NACK feedback for multiple DL transmissions in time can be transmitted in one UL data/control region. Timing between DL data reception and corresponding acknowledgement is indicated by a field in the DCI from a set of values and the set of values is configured by a higher layer. The timing(s) is (are) defined at least for the case where the timing(s) is (are) unknown to the UE.

In LTE Licensed Assisted Access (LAA), Listen Before Talk (LBT) is used to prevent collision. However, transmitting HARQ ACK/NACKs may occupy many DL transmission instances, resulting in inefficiencies in the LBT mechanism. Thus, a Downlink Feedback Information (DFI) format can be used to support Autonomous UpLink (AUL) in LAA. The DFI is a bitmap that indicates ACK-NACKs of a configured HARQ process ID. By using DFI, a base station can indicate multiple ACK-NACKs in one transmission.

An AUL-DFI is specified to carry at least AUL HARQ feedback. In aspects, a bitmap is included with a HARQ-ACK-bit for each AUL-configured HARQ process per TB. In addition, the HARQ feedback includes pending feedback for several uplink transmissions from the same UE. Redundancy Version (RV) is not included in the AUL-DFI. Also, transmission of AUL-DFI on an unlicensed cell is supported, as well as any other scheduling cell. Further, AUL-DFI contains HARQ-ACK feedback for scheduled-based uplink (SUL) transmissions using AUL-enabled HARQ IDs. However, AUL is not allowed for SUL retransmission. The AUL-DFI also includes a field indicating Transmission Power Control (TPC) for a PUSCH (2 bits), applicable for both AUL and SUL transmissions.

Generally, any HARQ process that is transmitted by SUL is not eligible for AUL retransmissions. This applies to SUL first transmission as well as for scheduled retransmissions of an earlier AUL transmission of the same TB. Further, the UE may only use such a HARQ process for AUL if the corresponding AUL-DFI indicated ACK.

Figure 6:
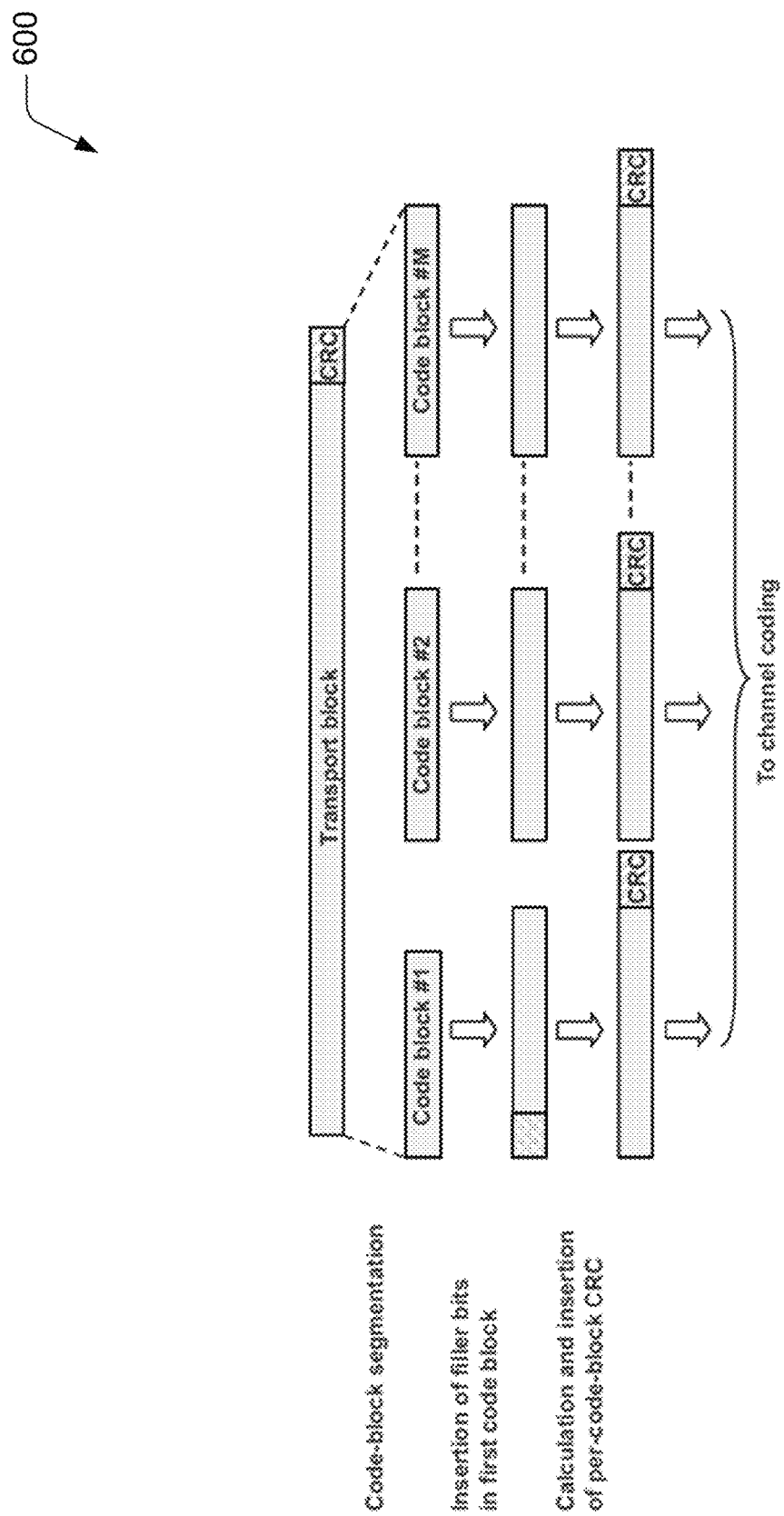
FIG. 6 illustrates an example implementation of code-block segmentation.

FIG. 6 illustrates an example implementation of code-block segmentation. Information bits transported from a media access control (MAC) layer are referred to as the Transport Block (TB). Once the physical layer receives the TB, it inserts a CRC with the TB. If the length of the TB with the CRC is too long for the encoder, the physical layer segments the TB with the CRC to multiple Code Blocks (CB) and inserts another CRC to each CB, as shown in FIG. 6. A CB with a CRC can then be channel coded and rate-matched as a code word.

Example Procedures

Example methods 700 and 800 are described with reference to FIGS. 7 and 8, respectively, in accordance with one or more aspects of HARQ in NOMA Transmission for 5G NR. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
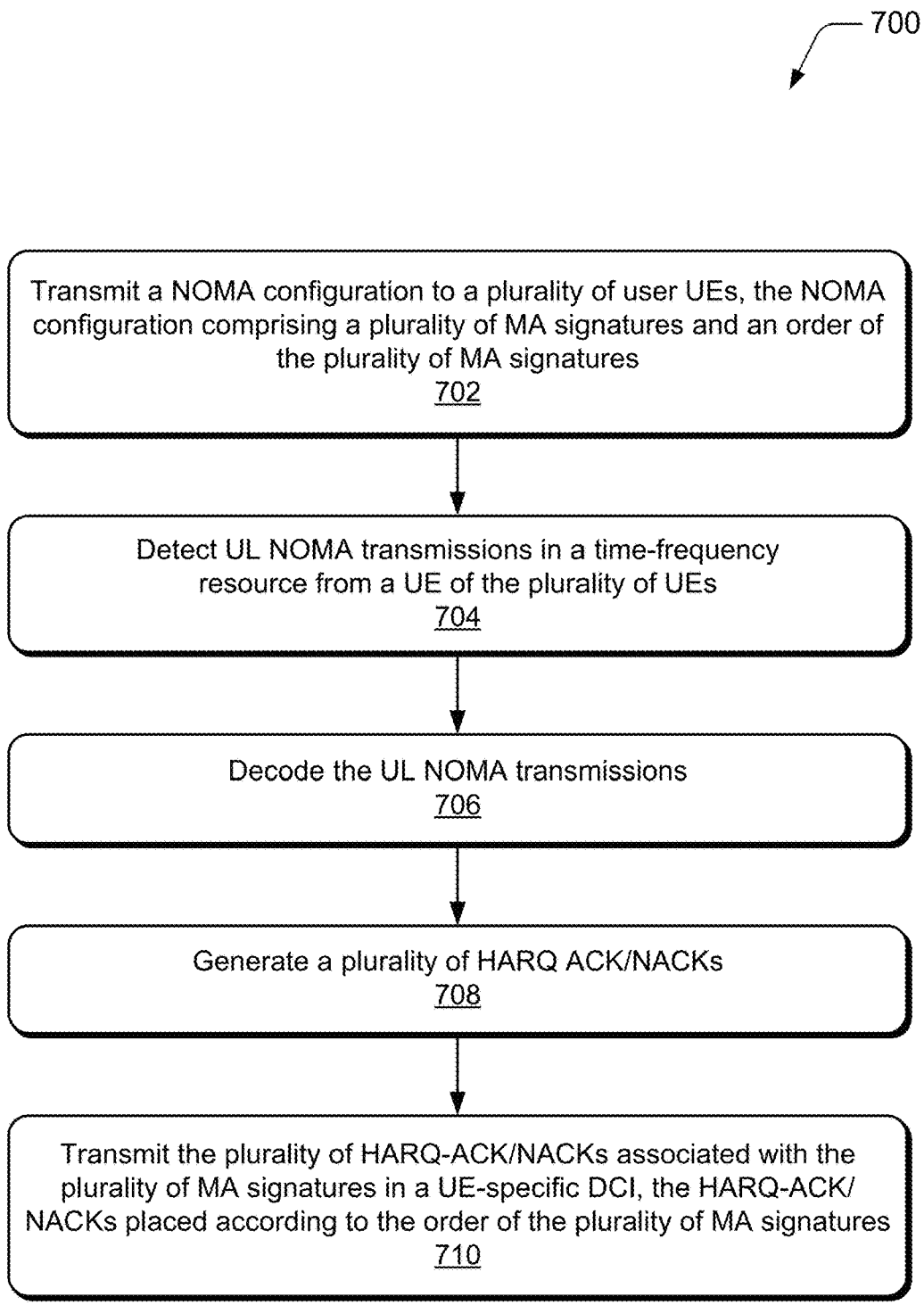
FIG. 7 depicts an example method of HARQ in NOMA transmissions for 5G NR in accordance with aspects of the techniques described herein.

FIG. 7 depicts an example method 700 of HARQ in NOMA transmissions for 5G NR in accordance with aspects of the techniques described herein. The order in which the method blocks are described are not intended to be construed as a limitation, and any number of the described method blocks can be combined in any order to implement a method, or an alternate method.

At block 702, a NOMA configuration is transmitted to a plurality of UEs. For example, the base station 104 can transmit a NOMA configuration to a plurality of UEs 102 via the wireless link 106. In aspects, the NOMA configuration includes a plurality of MA signatures and an order of the plurality of MA signatures.

At block 704, uplink (UL) NOMA transmissions are detected in a time-frequency resource. For example, the base station 104 can detect UL NOMA transmissions transmitted by one or more of the UEs 102 using the time-frequency resource.

At block 706, the UL NOMA transmissions are decoded. For example, the base station 104 can decode the UL NOMA transmissions received from the UE 102.

At block 708, a plurality of HARQ-ACK/NACKs are generated. In an example, the base station 104 generates the plurality of HARQ-ACK/NACKs each corresponding to a TB or a CB of a TB. In addition, a CRC is inserted into each CB. Then, each CB with a CRC is channel-coded and rate-matched as a code word.

At block 710, the plurality of HARQ-ACK/NACKs associated with the plurality of MA signatures are transmitted in a UE-specific downlink control information (DCI). In aspects, the plurality of HARQ-ACK/NACKs are placed according to the order of the plurality of MA signatures. In an example, the number of HARQ-ACK/NACKs is carried by the system information, radio resource control (RRC) configured to the UE, or written in a specification of the DCI.

In aspects, the base station 104 can generate a bitmap in the DCI to map bits to ACK/NACKs associated with the plurality of MA signatures. In an example, the bitmap has a length equal to the number of signatures in the plurality of MA signatures. In the bitmap, each ACK/NACK can correspond to a particular MA signature and indicate whether decoding of the TBs or CBs by the base station 104 succeeded or failed. In addition, one or more bits in the bitmap can indicate an ACK/NACK associated to a code word generated by the UE from a code block or a transport block.

Figure 8:
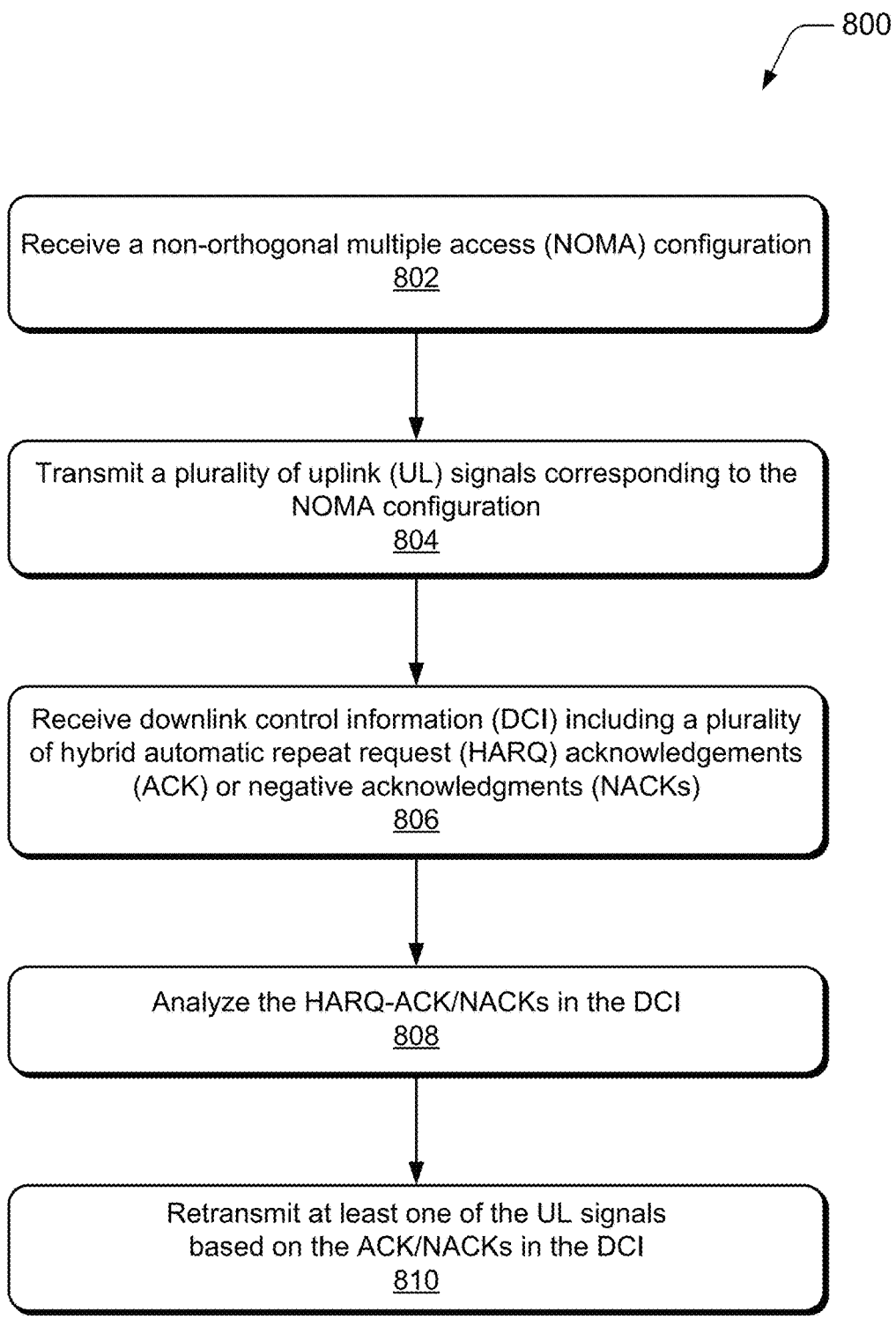
FIG. 8 depicts an example method of HARQ in NOMA transmissions for 5G NR in accordance with aspects of the techniques described herein.

FIG. 8 depicts an example method 800 of HARQ in NOMA transmissions for 5G NR in accordance with aspects of the techniques described herein. The order in which the method blocks are described are not intended to be construed as a limitation, and any number of the described method blocks can be combined in any order to implement a method, or an alternate method.

At block 802, a NOMA configuration is received. For example, the UE 102 receives the NOMA configuration from the base station 104 via the wireless link 106. In aspects, the NOMA configuration includes a plurality of MA signatures and an order of the MA signatures.

At block 804, a plurality of UL signals corresponding to the NOMA transmission are transmitted. In an example, the UE 102 transmits the UL signals to the base station 104. In at least some aspects, the UE generates a code word for one or more transport blocks and/or code blocks, and then transmits each code word with an MA signature. In one example, the UE generates a plurality of code words from one transport block and then transmits the plurality of code words with multiple MA signatures.

At block 806, a DCI including a plurality of HARQ-ACK/NACKs is received. In an example, the DCI is received by the UE 102 from the base station 104. The HARQ-ACK/NACKs each correspond to a TB or a CB of a TB.

At block 808, the HARQ-ACK/NACKs in the DCI are analyzed. For example, the UE 102 analyzes the HARQ-ACK/NACKs in the DCI received from the base station 104 to determine which, if any, UL signals failed decoding by the base station 104. In aspects, the UE 102 can determine, using the HARQ-ACK/NACKs, which transport blocks or code blocks failed decoding by the base station 104.

At block 810, at least one of the UL signals is retransmitted based on the HARQ-ACK/NACKs in the DCI. For example, the UE 102 can retransmit only those transport blocks or code blocks that correspond to the NACKs. In aspects, the UE can retransmit a single code word with the same MA signature according to the association between the ACK/NACKs and the MA signatures, rather than retransmit all code words from a transport block.

Example Device

Figure 9:
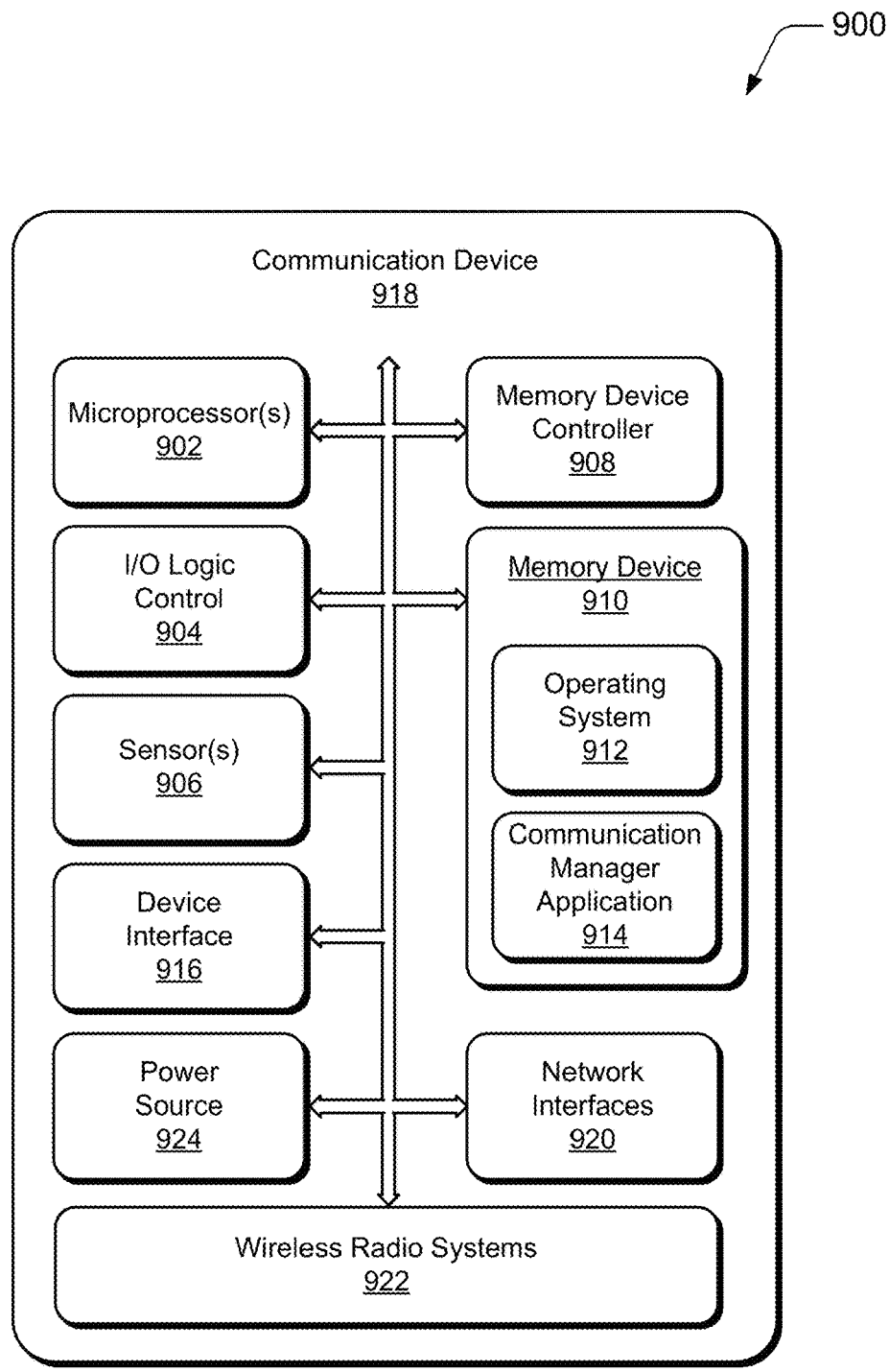
FIG. 9 illustrates an example communication device that can be implemented as the user equipment 102 in accordance with one or more aspects of HARQ in NOMA Transmission for 5G NR as described herein

FIG. 9 illustrates an example communication device 900 that can be implemented as the user equipment 102 in accordance with one or more aspects of HARQ in NOMA Transmission for 5G NR as described herein. The example communication device 900 may be any type of mobile communication device, computing device, client device, mobile phone, tablet, communication, entertainment, gaming, media playback, and/or other type of device.

The communication device 900 can be integrated with electronic circuitry, microprocessors, memory, input output (I/O) logic control, communication interfaces and components, as well as other hardware, firmware, and/or software to implement the device. Further, the communication device 900 can be implemented with various components, such as with any number and combination of different components as further described with reference to the user equipment 102 shown in FIGS. 1 and 2.

In this example, the communication device 900 includes one or more microprocessors 902 (e.g., microcontrollers or digital signal processors) that process executable instructions. The device also includes an input-output (I/O) logic control 904 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits.

The one or more sensors 906 can be implemented to detect various properties such as acceleration, temperature, humidity, supplied power, proximity, external motion, device motion, sound signals, ultrasound signals, light signals, global-positioning-satellite (GPS) signals, radio frequency (RF), other electromagnetic signals or fields, or the like. As such, the sensors 906 may include any one or a combination of temperature sensors, humidity sensors, accelerometers, microphones, optical sensors up to and including cameras (e.g., charged coupled-device or video cameras), active or passive radiation sensors, GPS receivers, and radio frequency identification detectors.

The communication device 900 includes a memory device controller 908 and a memory device 910 (e.g., the computer-readable storage media 212), such as any type of a nonvolatile memory and/or other suitable electronic data storage device. The communication device 900 can also include various firmware and/or software, such as an operating system 912 that is maintained as computer-executable instructions by the memory and executed by a microprocessor. The device software may also include a communication manager application 914 that implements aspects of HARQ in NOMA Transmission for 5G NR. The computer-readable storage media described herein excludes propagating signals.

The communication device 900 also includes a device interface 916 to interface with another device or peripheral component, and includes an integrated data bus 918 that couples the various components of the communication device 900 for data communication between the components. The data bus in the mesh network device may also be implemented as any one or a combination of different bus structures and/or bus architectures.

The device interface 916 may receive input from a user and/or provide information to the user (e.g., as a user interface), and a received input can be used to determine a setting. The device interface 916 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 916 may also receive inputs from any number of peripherals, such as buttons, a keypad, a switch, a microphone, and an imager (e.g., a camera device).

The communication device 900 can include network interfaces 920, such as a wired and/or wireless interface for communication with other devices via Wireless Local Area Networks (WLANs), wireless Personal Area Networks (PANs), and for network communication, such as via the Internet. The network interfaces 920 may include Wi-Fi, Bluetooth™, BLE, and/or IEEE 802.19.4. The communication device 900 also includes wireless radio systems 922 for wireless communication with cellular and/or mobile broadband networks. Each of the different radio systems can include a radio device, antenna, and chipset that is implemented for a particular wireless communications technology, such as the antennas 202, the RF front end 204, the LTE transceiver 206, and/or the 9G NR transceiver 208. The communication device 900 also includes a power source 924, such as a battery and/or to connect the device to line voltage. An AC power source may also be used to charge the battery of the device.

Although aspects of HARQ in NOMA Transmission for 5G NR have been described in language specific to features and/or methods, the subject of the appended claims is not necessarily limited to the specific features or methods described. Rather, the specific features and methods are disclosed as example implementations of HARQ in NOMA Transmission for 5G NR, and other equivalent features and methods are intended to be within the scope of the appended claims. Further, various different aspects are described, and it is to be appreciated that each described aspect can be implemented independently or in connection with one or more other described aspects.

What is claimed is:

1. A method for a base station to configure and communicate with a user equipment (UE), the method comprising:
   transmitting, by the base station, a non-orthogonal multiple access (NOMA) configuration to a plurality of UEs via a wireless link, the NOMA configuration including a plurality of multiple access (MA) signatures and an order of the plurality of MA signatures;
   detecting, by the base station, uplink (UL) NOMA transmissions from a UE of the plurality of UEs via the wireless link, the UL NOMA transmissions from the UE including at least two MA signatures selected by the UE from the plurality of MA signatures, the UL NOMA transmissions and the at least two MA signatures associated with at least two parallel hybrid automatic repeat request (HARQ) processes at the UE;
   decoding, by the base station, the UL NOMA transmissions;
   generating, by the base station, a plurality of HARQ acknowledgments (ACK) or negative acknowledgments (NACKs) associated with the at least two parallel HARQ processes at the UE and based on the UL NOMA transmissions from the UE; and
   transmitting, by the base station, the plurality of HARQ-ACK/NACKs associated with the at least two parallel HARQ processes at the UE in a UE-specific downlink control information (DCI) via the wireless link, the HARQ-ACK/NACKs placed according to the order of the plurality of MA signatures.

2. The method of claim 1, wherein a number of HARQ-ACK/NACKs of the plurality of HARQ-ACK/NACKs is carried by system information, radio resource control (RRC) configured to the UE, or written in a specification of the DCI.

3. The method of claim 1, further comprising generating, by the base station, a bitmap in the DCI to map bits to HARQ-ACK/NACKs associated with the plurality of MA signatures.

4. The method of claim 3, wherein the bitmap has a length equal to a number of MA signatures of the plurality of MA signatures.

5. The method of claim 3, wherein one bit in the bitmap indicates an ACK/NACK associated to a code word generated from a code block or a transport block associated with the NOMA configuration.

6. The method as recited in claim 1, wherein the UL NOMA transmissions comprise multi-layer transmissions, and
wherein the at least two MA signatures comprise layer-specific MA signatures.

7. The method as recited in claim 1, wherein generating the plurality of HARQ ACK/NACKs further comprises:
generating a first HARQ ACK/NACK of the plurality of HARQ ACK/NACKs for a transport block of the uplink (UL) NOMA transmissions; or
generating a second HARQ ACK/NACK of the plurality of HARQ ACK/NACKs for a code block of the transport block.

8. The method as recited in claim 1, wherein the at least two parallel HARQ processes at the UE are simultaneous, parallel HARQ processes.

9. A method for a user equipment (UE) to communicate with a base station, the method comprising:
receiving, by the UE, a non-orthogonal multiple access (NOMA) configuration from the base station via a wireless link, the NOMA configuration including a plurality of multiple access (MA) signatures and an order of the plurality of MA signatures;
transmitting, by the UE, a plurality of uplink (UL) signals corresponding to the NOMA configuration via the wireless link for receipt by the base station, the plurality of UL signals including at least two MA signatures selected by the UE from the plurality of MA signatures, the plurality UL signals and the at least two MA signatures associated with at least two parallel hybrid automatic repeat request (HARQ) processes at the UE;
receiving, by the UE and from the base station, downlink control information (DCI) including a plurality of HARQ acknowledgments (ACK) or negative acknowledgments (NACKs) associated with the at least two parallel HARQ processes at the UE;
analyzing, by the UE, the HARQ-ACK/NACKs in the DCI; and
retransmitting, by the UE, at least one of the UL signals to the base station based on the HARQ-ACK/NACKs in the DCI.

10. The method of claim 9, further comprising:
generating, by the UE, a plurality of code words from one transport block; and
transmitting, by the UE and to the base station, the plurality of code words using the at least two MA signatures of the plurality of MA signatures.

11. The method of claim 9, further comprising:
generating, by the UE, a plurality of code words from one transport block; and
transmitting, by the UE, plurality of code words with the at least two MA signatures.

12. The method as recited in claim 9, wherein the plurality of UL signals comprise multi-layer transmissions, and
wherein the at least two MA signatures comprise layer-specific MA signatures.

13. The method as recited in claim 9, wherein receiving the plurality of HARQ ACK/NACKs further comprises:
receiving a first HARQ ACK/NACK of the plurality of HARQ ACK/NACKs for a transport block of the uplink (UL) NOMA transmissions; or
receiving a second HARQ ACK/NACK of the plurality of HARQ ACK/NACKs for a code block of the transport block.

14. The method as recited in claim 9, wherein the at least two parallel HARQ processes at the UE are simultaneous, parallel HARQ processes.

* * * * *